United States Patent [19]
Gebhardt

[11] 3,890,861
[45] June 24, 1975

[54] METHOD AND APPARATUS FOR SAWING A PANEL INTO PORTIONS
[75] Inventor: Fritz Gebhardt, Nurtingen, Germany
[73] Assignee: Karl M. Reich Maschinenfabrik GmbH, Nurtingen, Germany
[22] Filed: Feb. 1, 1974
[21] Appl. No.: 438,557

[30] Foreign Application Priority Data
Feb. 6, 1973  Germany............................ 2305673
Dec. 1, 1973  Germany............................ 2359988

[52] U.S. Cl. .......................... 83/23; 83/34; 83/453; 83/471.3; 83/489
[51] Int. Cl. ............................................... B27b 5/06
[58] Field of Search ...... 83/23, 34, 453, 461, 471.2, 83/471.3, 489

[56] References Cited
UNITED STATES PATENTS
3,283,790  11/1966  Strisbig .............................. 83/471.3

Primary Examiner—J. M. Meister
Attorney, Agent, or Firm—Hans Berman

[57] ABSTRACT

An upright rectangular frame has a roller conveyor in its lower horizontal member, carries hydraulically operated clamps on its upright members, and movably supports a carrier for a tilting circular saw on its upper horizontal member. A panel of plywood and the like can be cut horizontally into two sections while the lower edge of the lower section rests on the roller conveyor and the upper section is clamped to the frame. The lower section may then be shifted horizontally on the roller conveyor in the original plane of the panel and further divided into parts by vertical saw cuts, whereupon the upper panel section is lowered to the roller conveyor, and the procedure is repeated until the panel is entirely divided into portions of desired size.

3 Claims, 4 Drawing Figures

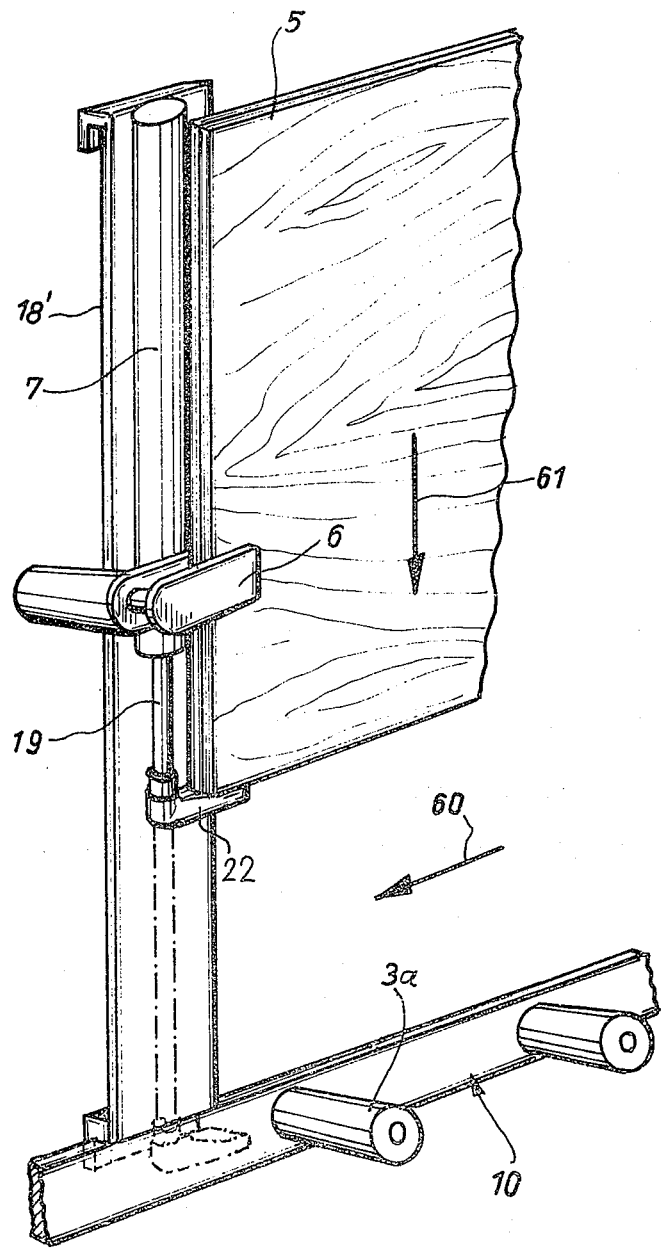

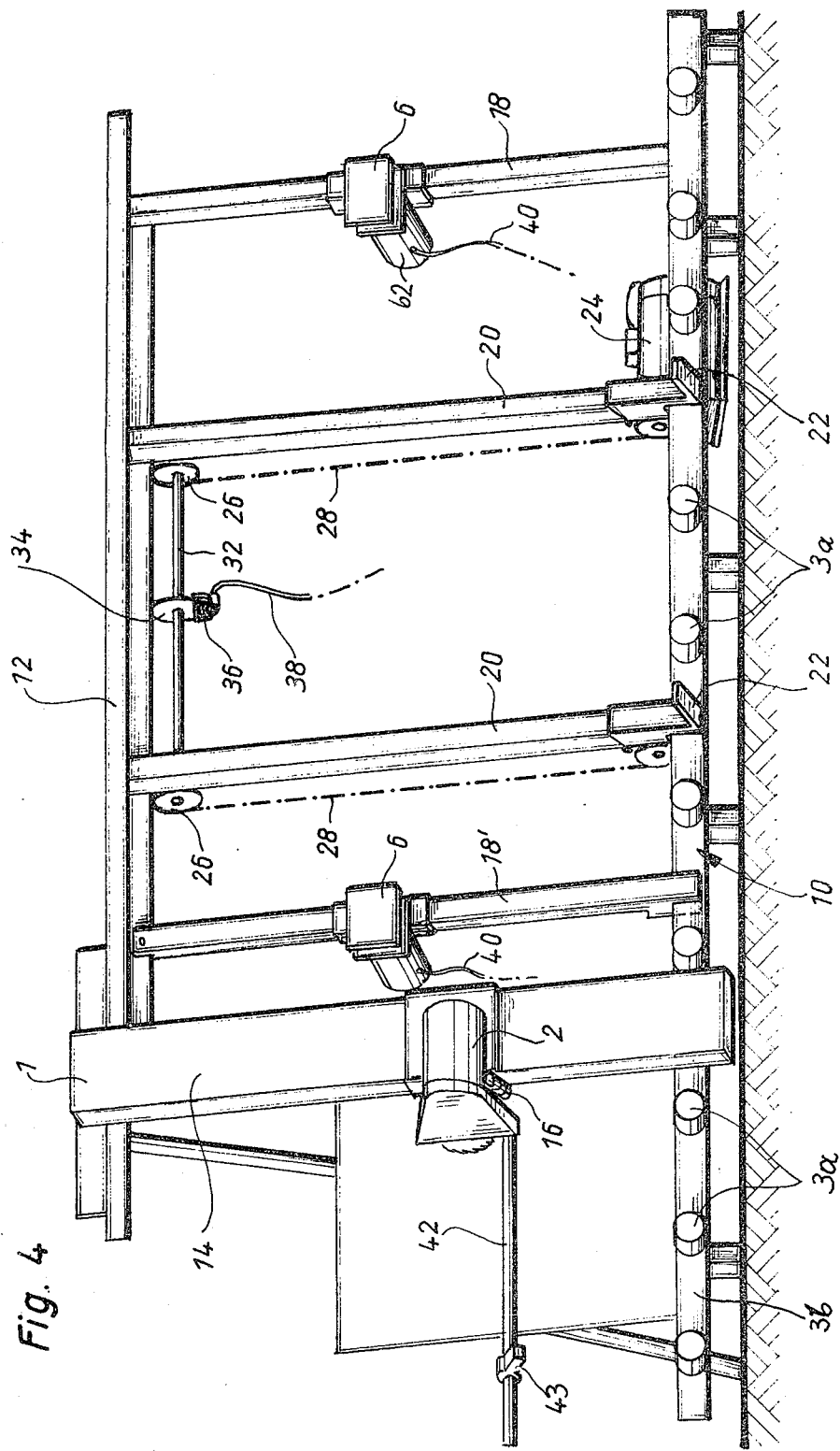

METHOD AND APPARATUS FOR SAWING A PANEL INTO PORTIONS

This invention relates to carpentry, and particularly to a method and apparatus for sawing a panel into portions by several cuts in at least two directions transverse to each other.

Radial arm saws having a horizontal table permit panels of plywood and like large, planar bodies to be divided into smaller portions quickly and conveniently, but the table of a radial arm saw capable of accommodating a standard panel, 8 feet long and 4 feet wide, or panels of even larger size, requires much floor space. Where such space is not available, it has been common practice to stand the panel on one of its long edges while backed by an upright saw frame. The panel is divided into several sections by a series of horizontal cuts, beginning near the top edge and working down, and the long sections are removed from the frame as they are severed from the remainder of the panel. They are then returned to the frame one by one and cut transversely into the desired individual pieces. The procedure is slow, and usually requires more than one man if the original panel is large.

A primary object of the invention is the provision of a method for dividing a panel into individual pieces by longitudinal and transverse saw cuts in a faster and less laborious manner than was available heretofore while retaining the advantage of modest floor space requirements inherent in the afore-described conventional method.

Another important object is the provision of apparatus for performing the method outlined above with a minimum of manual labor.

With these and other objects in view, the invention, in one of its more specific aspects, resides in a method of dividing a substantially planar panel having an edge which comprises standing the panel on a support in a position in which the afore-mentioned edge is at least approximately horizontal, and the panel extends upward from the edge. The panel is first cut spacedly parallel to the edge into a lower section and an upper section, while the upper section is secured in its position relative to the support. Another edge is formed thereby on the upper section. The lower section thereafter is cut transversely to the first cut into at least two, but usually more, pieces which are removed from the support. The upper section thereafter is lowered until its newly formed edge rests on the support. The initially upper section thereafter is cut spacedly parallel to its newly formed edge into two parts, and the procedure is repeated until the entire panel is divided into the desired pieces.

The apparatus employed for performing the above method may include a supporting frame which defines a vertically extending plane of support for the panel to be divided. A saw unit is mounted on the frame for simultaneous or sequential movement in horizontal and vertical paths in cutting engagement with a panel extending in the plane of support. Releasable clamps on the frame permit the panel to be secured in that plane, and a moving device mounted on the frame permits a panel to be moved relative to the clamping device in the plane in a vertically extending direction.

Other features, additional objects, and many of the attendant advantages of this invention will readily be appreciated, as the same becomes better understood from the following detailed description of preferred embodiments, when considered in connection with the appended drawing in which:

FIG. 3 illustrates a modification of the apparatus of FIGS. 1 and 2 in a fragmentary perspective view; and FIG. 4 shows the apparatus of FIGS. 1 and 2 on a larger scale in greater detail, and without the panel.

Figure 1:
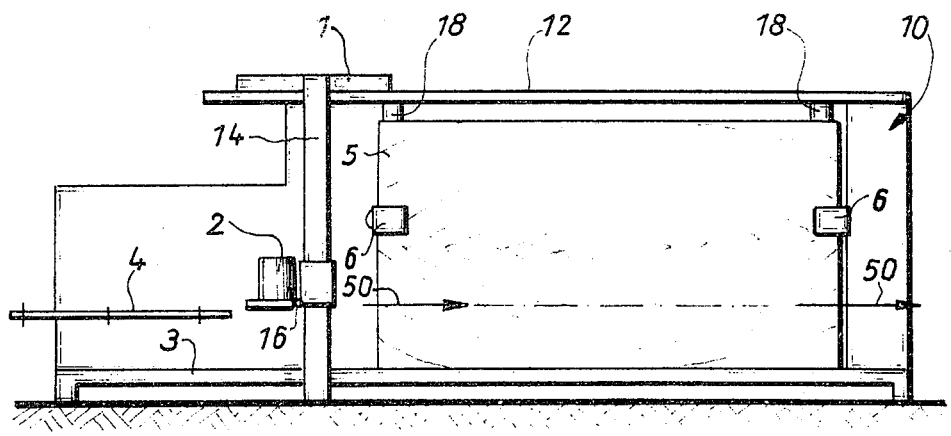
FIG. 1 shows apparatus of the invention and a panel to be cut in front elevation.

Referring initially to FIG. 1, there is seen an elongated, rectangular frame 10 whose long horizontal bottom member 3 rests on the ground, the two short members 18, 18' of the frame extending upward from the bottom member 3 in a vertical, or almost vertical direction and carrying the horizontal top member 12. The latter serves as a guide or support for a saw carrier 1 which includes an approximately vertical guide rail 14 for a circular saw assembly 2. A base portion of the saw assembly slides vertically on the rail 14, and may be secured in an adjusted vertical position as is conventional and not specifically shown. The motor and circular saw blade are mounted on the base portion by means of a hinge 16. In the position seen in FIG. 1, the saw assembly is arranged for making horizontal cuts as indicated by the arrow 50.

Each short frame member 18, 18' carries a clamping device 6. In the condition of the apparatus seen in FIG. 1, the clamping devices 6 hold a panel 5 of plywood. The bottom edge of the rectangular panel stands on the bottom member 3 of the frame, and the cutting line indicated by the arrow 50 is parallel to the bottom edge and on a level between the bottom edge and the clamping devices 6. An adjustable abutment 4 is mounted on the frame in the plane of support for the panel 5 defined by the frame and its devices, but outside the portion of the plane occupied by the panel 5 in FIG. 1.

Figure 2:
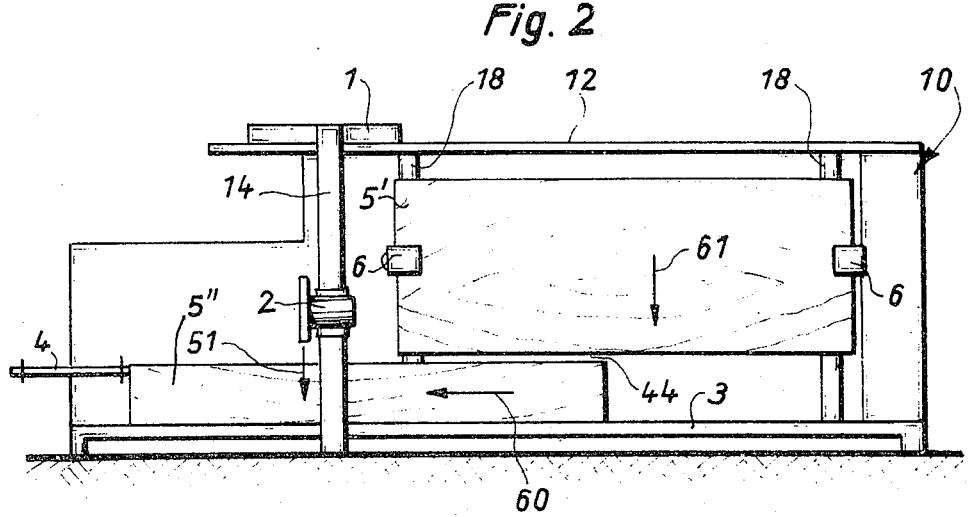
FIG. 2 illustrates the apparatus and panel of FIG. 1 in a different operating condition.

FIG. 2 shows the device of FIG. 1 in a condition after the saw assembly 2 has been moved horizontally back and forth in the direction of the arrow 50 so as to divide the panel 5 into an upper section 5' secured in its position by the clamping devices 6, and a lower section 5" resting on the bottom frame member 3. A horizontally elongated gap 44 is formed by the teeth of the circular saw in the saw arrangement 2 between the panel sections 5', 5". As seen in FIG. 2, the lower section 5" was shifted on the bottom frame member 3 in the direction of the horizontal arrow 60 in the original plane of support toward the abutment 4, the saw arrangement was tilted for vertical cutting in the direction of the arrow 51, and for thereby dividing the lower section 5" into individual pieces which may then be removed from the frame 10.

As is shown in more detail in FIG. 4, the bottom member of the frame 10 consists of two parallel bars 3b and a row of rollers 3a mounted between the bars for rotation about respective parallel axes transverse to the afore-mentioned plane of support. The bottom frame member, in effect, constitutes a roller conveyor which permits the lower section 5" to be shifted into the position shown in FIG. 2 with minimal effort.

The abutment 4 consists of a horizontal cylindrical bar 42 from which a stop 43 extends into the path of a panel section traveling on the rollers 3a. The stop 43 may be shifted along the bar 42 and secured in any desired position by means of a set screw, not explicitly shown and conventional.

The short frame member 18 fixedly connects the top and bottom members 12, 3, but the longitudinal mounting ends of the frame member 18' are bifurcated movably to receive edge portions of the long frame members. The member 18' thus may be shifted horizontally together with the clamping device 6 mounted thereon for accommodating panels of different length. The clamps of the two clamping devices 6 are each operated by hydraulic cylinders 62. Hoses 40 connect the cylinders 62 with control valves and the positive displacement pump of a conventional hydraulic circuit, not shown.

The top frame member 12 and the bottom frame member 3 are connected by two spacedly parallel guide rails 20 slidably engaged by brackets 22 which project from the guide rails into the plane of support for the panel omitted from the showing of FIG. 4. The brackets 22 are attached to respective links of two parallel chains 28 each trained over respective sprockets 26 near the top and bottom members of the frame 10. The output shaft of an electric motor 24 mounted on the frame member 3 carries one of the lower sprockets. The two upper sprockets are fixedly connected by a common shaft 32 journaled in the frame in a manner not shown and conventional. The other lower sprocket is also mounted on the frame in a manner not explicitly illustrated. The disc 34 of a hydraulic disc brake 36 is mounted on the shaft 32, the stationary portion of the brake being fastened on the frame 10 in a manner not shown. A hose 38 provides operating fluid for the disc brake 36 from the afore-mentioned, non-illustrated hydraulic system.

As is seen in FIG. 4, the frame 10 is not precisely vertical, but tilted back slightly so that a panel resting on the rollers 3a is safely secured on the frame by gravity. After the panel 5 is cut horizontally into upper and lower sections 5', 5", as described above with reference to FIGS. 1 and 2, the lower section 5" is moved on the rollers 3a toward the left, as viewed in FIGS. 1, 2, and 4, until its leading upright edge abuts against the suitably set stop 43. It is then cut vertically into two parts, the leading part is removed, and the remainder of the lower section 5" is moved against the stop 43 and vertically cut until it is divided into the desired number of smaller parts.

Thereafter, the motor 24 is energized to raise the brackets 22 simultaneously and in horizontal alignment into engagement with the freshly cut lower edge of the upper panel section 5'. The hydraulic cylinders 62 are vented to a sump by the non-illustrated hydraulic system, so that the clamps 6 release the upper panel section, and the motor 24 is deenergized so as to permit the initially upper panel section 5' to descend under gravity at a rate that may be controlled by means of the brake 36 until the section 5' rests on the rollers 3a. It may then be clamped by the devices 6 whose position may be adjusted vertically for this purpose, and another horizontal cut may be made between the clamps 6 and the rollers 3a. This procedure of alternating horizontal and vertical cuts performed in the same plane is repeated as often as is needed to cut the panel into individual pieces whose size is determined by shifting the saw assembly 2 vertically on the rail 14 prior to horizontal cuts, and by horizontally shifting the stop 43 on the rod 42.

A modification of the apparatus of FIGS. 1, 2, and 4 which makes it unnecessary to provide guide rails for the brackets 22 is shown in FIG. 3, the apparatus being identical with that described above as far as not specifically stated otherwise.

The short frame member 18' carries a vertical, or approximately vertical hydraulic cylinder 7 whose piston rod 19 carries a bracket 22. The other bracket 22 is supported in the same manner on the frame member 18, not itself seen in FIG. 3. The dimensions of the piston 7 and the piston rod 19 are chosen to permit movement of the bracket 22 into the position shown in broken lines in which the bottom edge of a panel being lowered by the brackets as indicated by the arrow 61 is deposited on the rollers 3a for further horizontal movement in the direction of the arrow 60.

While the apparatus of the invention and its operation have been described with reference to plywood panels, it is capable of cutting panels of other material subject to minor modifications, such as the replacement of saw blades. When marble slabs or like heavy panels are to be cut, the severed lower section of a panel may not conveniently be moved manually on the roller track of the lower frame member 3, and the use of motor-driven conveyor rollers is specifically contemplated. Depending on specific operating conditions, the roller conveyor may also be inclined slightly to the horizontal to facilitate or impede movement of a cut panel section in the direction of the arrow 60.

The illustrated clamping devices 6 have each one jaw mounted on the associated frame member 18, 18' for vertical adjustment, and another jaw member mounted on the obscured piston rod of a cylinder 62 so that the two jaws are moved toward each other under hydraulic pressure, and are moved apart by a non-illustrated return spring in the cylinder 62 when the fluid pressure is relaxed. However, pivotally connected, hydraulically operated clamps are known and may be used to advantage if a panel is to be placed in its cutting position by horizontal movement at right angles to the plane of FIG. 1. The illustrated clamps are intended for use in an arrangement in which the panel to be divided is supplied by a hoist on a monorail conveyor and slid into the clamps 6 from above.

For light panels, such as ¼ inch plywood and thin wood composition panels, a hydraulic clamping system is unnecessary, and the clamps may be replaced by suction cups connected to a vacuum system. Such cups may be mounted on a common horizontal bar vertically slidable on the frame 10 proper.

Removing the severed lower panel portions in the plane of support defined by the frame 10, as is shown in FIGS. 1, 2, and 4, is usually most convenient and permits the same saw assembly 2 to be used for making vertical as well as horizontal cuts. However, these advantages may be retained, and further advantages gained by providing hydraulically operated brackets, as shown in FIG. 3, which pull the severed lower panel section at right angles to the plane of FIG. 1 to a suitable extension of the bottom frame member 3 to permit the upper section to be lowered and further cut horizontally, whereupon an entire stack of severed sections may be sliced vertically in a single cut by the saw assembly 2. Hydraulically operated brackets are not needed for moving severed lower sections of light plywood panels out of the support plane of the frame 10, and such lower sections may be moved out manually to permit the upper section to be lowered.

Other modifications of the apparatus illustrated and described will readily suggest themselves to those skilled in the art without departing from the spirit and scope of this invention as set forth in the appended claims.

What is claimed is:

1. A method of dividing a substantially planar panel having an edge which comprises:
  a. standing said panel on a support in a position in which said edge is at least approximately horizontal, and the panel extends upward from said edge;
  b. first cutting said panel spacedly parallel to said edge into a lower section and an upper section while securing said upper section in the position thereof relative to said support, whereby another edge is formed on said upper section;
  c. thereafter cutting said lower section transversely to the direction of said first cutting into at least two pieces;
  d. removing said pieces from said support;
  e. lowering said upper section until said other edge rests on said support; and
  f. cutting said upper section spacedly parallel to said other edge into two parts.

2. A method as set forth in claim 1, wherein said panel, while in said position, defines a plane, and said lower section is shifted horizontally substantially in said plane prior to said transverse cutting of said lower section.

3. A method as set forth in claim 1, wherein said panel, while in said position, defines a plane, and said lower section is shifted out of said plane in a direction transverse to said plane prior to said transverse cutting of said lower section.

* * * * *